United States Patent [19]
Inoue et al.

[11] Patent Number: 5,771,294
[45] Date of Patent: Jun. 23, 1998

[54] ACOUSTIC IMAGE LOCALIZATION APPARATUS FOR DISTRIBUTING TONE COLOR GROUPS THROUGHOUT SOUND FIELD

[75] Inventors: Toshihiro Inoue; Hiroyuki Torimura, both of Hamamatsu, Japan

[73] Assignee: Yamaha Corporation, Hamamatsu, Japan

[21] Appl. No.: 725,544

[22] Filed: Oct. 3, 1996

Related U.S. Application Data

[62] Division of Ser. No. 302,112, Sep. 7, 1994, Pat. No. 5,585,587.

[30] Foreign Application Priority Data

Sep. 24, 1993 [JP] Japan ................................. 5-258862

[51] Int. Cl.$^6$ ....................................................... H04S 5/00
[52] U.S. Cl. ................................................. 381/17; 381/63
[58] Field of Search ................................... 381/1, 17, 63, 381/25

[56] References Cited

U.S. PATENT DOCUMENTS

| | | |
|---|---|---|
| 4,118,599 | 10/1978 | Iwahara et al. . |
| 4,188,504 | 2/1980 | Kasuga et al. . |
| 4,192,969 | 3/1980 | Iwahara . |
| 4,219,696 | 8/1980 | Kogure et al. . |
| 4,817,149 | 3/1989 | Myers . |
| 4,908,858 | 3/1990 | Ohno . |
| 4,980,914 | 12/1990 | Kunugi et al. . |
| 5,027,689 | 7/1991 | Fujimori . |
| 5,046,097 | 9/1991 | Lowe et al. . |
| 5,052,685 | 10/1991 | Lowe et al. . |
| 5,105,462 | 4/1992 | Lowe et al. . |
| 5,127,306 | 7/1992 | Mitsuhasi et al. . |
| 5,173,944 | 12/1992 | Begault ..................................... 381/17 |
| 5,174,944 | 12/1992 | Begault . |
| 5,305,386 | 4/1994 | Yamato . |
| 5,384,851 | 1/1995 | Fujimori . |
| 5,386,082 | 1/1995 | Higashi . |
| 5,406,022 | 4/1995 | Kobayashi . |
| 5,422,430 | 6/1995 | Ikeya et al. . |
| 5,440,639 | 8/1995 | Suzuki et al. . |
| 5,452,359 | 9/1995 | Inanaga et al. ........................... 381/25 |
| 5,467,401 | 11/1995 | Nagamitsu et al. ..................... 381/63 |
| 5,478,968 | 12/1995 | Kitagawa et al. ........................ 84/626 |
| 5,524,053 | 6/1996 | Iwamatsu ................................. 381/18 |

FOREIGN PATENT DOCUMENTS

| | | |
|---|---|---|
| 355835 | 8/1991 | Japan . |
| 414998 | 1/1992 | Japan . |

*Primary Examiner*—Forester W. Isen
*Attorney, Agent, or Firm*—Pillsbury Madison & Sutro LLP

[57] ABSTRACT

An acoustic image localization apparatus localizes an acoustic image of a plurality of tone color species having various timbres to a source point with respect to a listening point within a sound field. Desired ones of separate source points are specified, which are provisionally set throughout the sound field. Each of the tone color species is assigned to one or more of the specified source points such that each specified source point is assigned with a group of desired tone color species. Acoustic images of the respective groups are localized to corresponding ones of the specified source points. Further, one of separate listening points is designated, which is provisionally set relatively to the source points so that the acoustic images are localized with respect to the designated listening point.

9 Claims, 11 Drawing Sheets

FIG.2

| Type | Listening point \ Source point | 1 | 2 | ... | 11 |
|---|---|---|---|---|---|
| Hall | A | HL1A, HR1A | HL2A, HR2A | ----- | HL11A, HR11A |
| Hall | B | HL1B, HR1B | HL2B, HR2B | ----- | HL11B, HR11B |
| Hall | C | HL1C, HR1C | HL2C, HR2C | ----- | HL11C, HR11C |
| Church | A | CL1A, CR1A | CL2A, CR2A | ----- | CL11A, CR11A |
| Church | B | CL1B, CR1B | CL2B, CR2B | ----- | CL11B, CR11B |
| Church | C | CL1C, CR1C | CL2C, CR2C | ----- | CL11C, CR11C |
| ------- | ----- | ----- | ----- | ----- | ----- |
| Room | A | RL1A, RR1A | RL2A, RR2A | ----- | RL11A, RR11A |
| Room | B | RL1B, RR1B | RL2B, RR2B | ----- | RL11B, RR11B |
| Room | C | RL1C, RR1C | RL2C, RR2C | ----- | RL11C, RR11C |

FIG.3

Conversion table

| Right source point | 12 | 13 | 14 | ......... | 19 |
|---|---|---|---|---|---|
| Left source point | 7 | 8 | 4 | ......... | 3 |

5,771,294

ACOUSTIC IMAGE LOCALIZATION APPARATUS FOR DISTRIBUTING TONE COLOR GROUPS THROUGHOUT SOUND FIELD

This is a divisional of application Ser. No. 08/302,112, filed Sep. 7, 1994, now U.S. Pat. No. 5,585,587

BACKGROUND OF THE INVENTION

The present invention relates to an acoustic image localization apparatus of an electronic musical instrument. The acoustic image localization apparatus is particularly applicable to the electronic musical instrument having a multiple of sound sources.

An audio system conventionally adopts an acoustic image localization called "binaural method". An audio signal recorded by the binaural method is reproduced through a headphone to thereby realize presence of a concert hall and to thereby form a sophisticated sound field. Recently, an electronic musical instrument also adopts localization of a performance sound to achieve a more realistic presence.

An acoustic image localization apparatus of the conventional electronic musical instrument will be described briefly in conjunction with FIGS. 10 and 11. FIG. 10 schematically illustrates a measurement of a transfer function at a pair of ears formed on a dummy head 101 within a room 104. In this example, based on the symmetry of right and left ears with respect to a center of the head, a microphone 102 is set alone into the right ear to measure a transfer function with respect to not only the right ear but also the left ear. As well known, the transfer function is given as a Laplace transform of an impulse response. Therefore, a sound source is utilized to emit an impulse toward the ear so as to readily measure the transfer function. In detail, the sound source 103 is positioned to a selected one of predetermined points as indicated by circles to emit an impulse of sound, and the microphone 102 attached to the right ear of the dummy head 101 receives the emitted impulse, which is analyzed to determine the transfer function associated to the selected point. The impulse sound source 103 is successively displaced to other points, thereby determining transfer functions of the right ear with respect to all the points which are provisionally determined throughout the listening room 104. With regard to the left ear, in view of the symmetry of the right and left ears with respect to the center line of the room 104, a transfer function of the left ear at one point is given as a measured transfer function of the right ear at another point which is symmetric to said one point with respect to the center line.

Referring to FIG. 11, the disclosed apparatus operates to localize an acoustic image of musical sounds with using the thus obtained transfer functions. The apparatus is provided with a tone generator 121 which generates a monaural signal in response to events played on a keyboard 120. A table memory 124 is provided for storing a data of the provisionally measured transfer functions in the form of finite impulse response (FIR) parameters. A pair of right and left FIR filters 122, 123 receive the monaural signal fed from the tone generator 121. Each of the FIR filters 122, 123 is set with a particular FIR parameter which is specified according to acoustic image localization coordinates X, Y. The FIR filters 122, 123 function as an electric simulator of the transfer function so as to filter the monaural signal according to the set FIR parameter. Additionally, an interpolator 125 is disposed between the table memory 124 and each of the FIR filters 122, 123 to interpolatively calculate the FIR parameter in case that the acoustic image localization coordinates X, Y specify an intermediate point which falls between the fixed points marked by the circles in FIG. 10. Namely, the interpolator 125 calculates the FIR parameter by interpolation of the stored FIR parameters corresponding to the fixed points in the vicinity of the intermediate point. A left amplifier 126 amplifies an output signal subjected to the acoustic image localization by the FIR filter 122 to produce a left channel signal. A right amplifier 127 amplifies another output signal subjected to the acoustic image localization by the FIR filter 123 to produce a right channel signal. The pair of the left and right channel signals are inputted into a headphone (not shown) to reproduce a stereo sound which has an acoustic image localized to the specified point.

However, the conventional acoustic image localization apparatus can localize only one acoustic image. Therefore, the conventional apparatus hardly realize a presence as if a multiple of sound sources are widely distributed throughout a sound field likewise an orchestra. Further, the conventional apparatus localizes an acoustic image with respect to a sole listening point, thereby restricting optimum positioning of a listener. Additionally in the measurement system of the transfer function shown in FIG. 10, a positional error may be produced between lefthand points and righthand points in practical reasons. Due to this positional error, the microphone attached to the dummy head may receive a somewhat shifted impulse response. Consequently, the measured transfer function is also irregularly shifted. Therefore, the conventional apparatus utilizing the shifted transfer function may localize the acoustic image in a rather vague form. Even worse, a stereo sound is not obtained but a monaural sound emerges when the acoustic image is localized just in front or back of the dummy head, because the transfer function measured with respect to the right ear is diverted to a transfer function of the left ear without actual measurement.

SUMMARY OF THE INVENTION

An object of the present invention is to provide an acoustic image localization apparatus for realizing a diverse and multiform localization of an acoustic image of a musical sound produced by an electronic musical instrument or the like. Another object of the present invention is to provide an acoustic image localization apparatus for localizing an acoustic image of a musical sound while selecting a desired listening point at which the localized acoustic image is heard.

According to one aspect of the present invention, an acoustic image localization apparatus localizes an acoustic image of a plurality of tone color species having various timbres to a source point within a sound field. The apparatus comprises means for specifying desired ones of separate source points which are provisionally set throughout the sound field, means for assigning each of the tone color species to one or more of the specified source point such that each specified source point is assigned with a group of desired tone color species, and means for localizing acoustic images of the respective groups to corresponding ones of the specified source points. By such a construction, the plurality of the tone color species can be diversely localized in the wide sound field to realize a presence of an orchestra or else.

According to another aspect of the present invention, an acoustic image localization apparatus localizes an acoustic image of a plurality of tone color species having various timbres to a source point with respect to a listening point within a sound field. The apparatus comprises means for assigning the plurality of the, tone color species to a multiple of source points which are provisionally set within the sound field such that each source point is assigned with a group of desired tone color species, means for designating one of separate listening points which are provisionally set relatively to the source points within the sound field, and means for localizing acoustic images of the respective groups to corresponding ones of the source points with respect to the designated listening point. By such a construction, an effective sound field recognized by audience can be evaluated by selecting the listening points.

In a more practical form, an electronic musical apparatus comprises generating means for generating a monaural signal containing a plurality of tone color species having various timbres, distributing means having a multiple of terminals and being receptive of the monaural signal for distributing each of the tone color species to one or more of the terminal such that each terminal collects a group of the tone color species selectively distributed thereto, localizing means having a multiple of localizing units connected correspondingly to the respective terminals such that each localizing unit processes a corresponding group of the tone color species to localize an acoustic image of the corresponding group separately from other groups in a given sound field, and output means receptive of all the groups from the localizing means for producing a stereo signal having a multiple of the acoustic images separately localized from each other in the sound field. Preferably, the electronic musical apparatus includes assigning means for selectively assigning one of source points which are predetermined separately from each other in the sound field, to one of the localizing units such that said one localizing unit localizes the acoustic image to the assigned source point as if the acoustic image originates from the assigned source point. Further, the electronic musical apparatus includes designating means for designating one of listening points which are predetermined separately from each other in the sound field so that each localizing unit localizes the respective acoustic image with respect to the designated listening point as if all the localized acoustic images are directed to the designated listening point. Moreover, the electronic musical apparatus includes selecting means for selecting one of predetermined sound fields so that each localizing unit localizes the respective acoustic image in the selected sound field as if all the acoustic images are presented in the selected sound field. Additionally, each localizing unit comprises a localizing filter for filtering the group of the tone species color to localize the acoustic image thereof according to a finite impulse response which is provisionally sampled binaurally in the given sound field. Namely, when the impulse response is provisionally sampled, a pair of microphones are attached to right and left ears, respectively, of a dummy head to binaurally measure the transfer function, thereby eliminating a positional error as opposed to the prior art. Therefore, the measured transfer function may not be shifted irregularly to thereby provide a clear acoustic image when localized according to the binaurally measured transfer function. Further, the actually measured transfer function is utilized in both of the right and left channels, thereby avoiding generation of a monaural sound along the center of the sound field in contrast to the prior art.

BRIEF DESCRIPTION OF DRAWINGS

FIG. 2 is a table diagram showing an example of FIR parameters determined according to the measured transfer functions.

FIG. 3 is a table diagram showing a symmetric relation of source points for use in conversion of the FIR parameters.

DETAILED DESCRIPTION OF THE INVENTION

Figure 1:
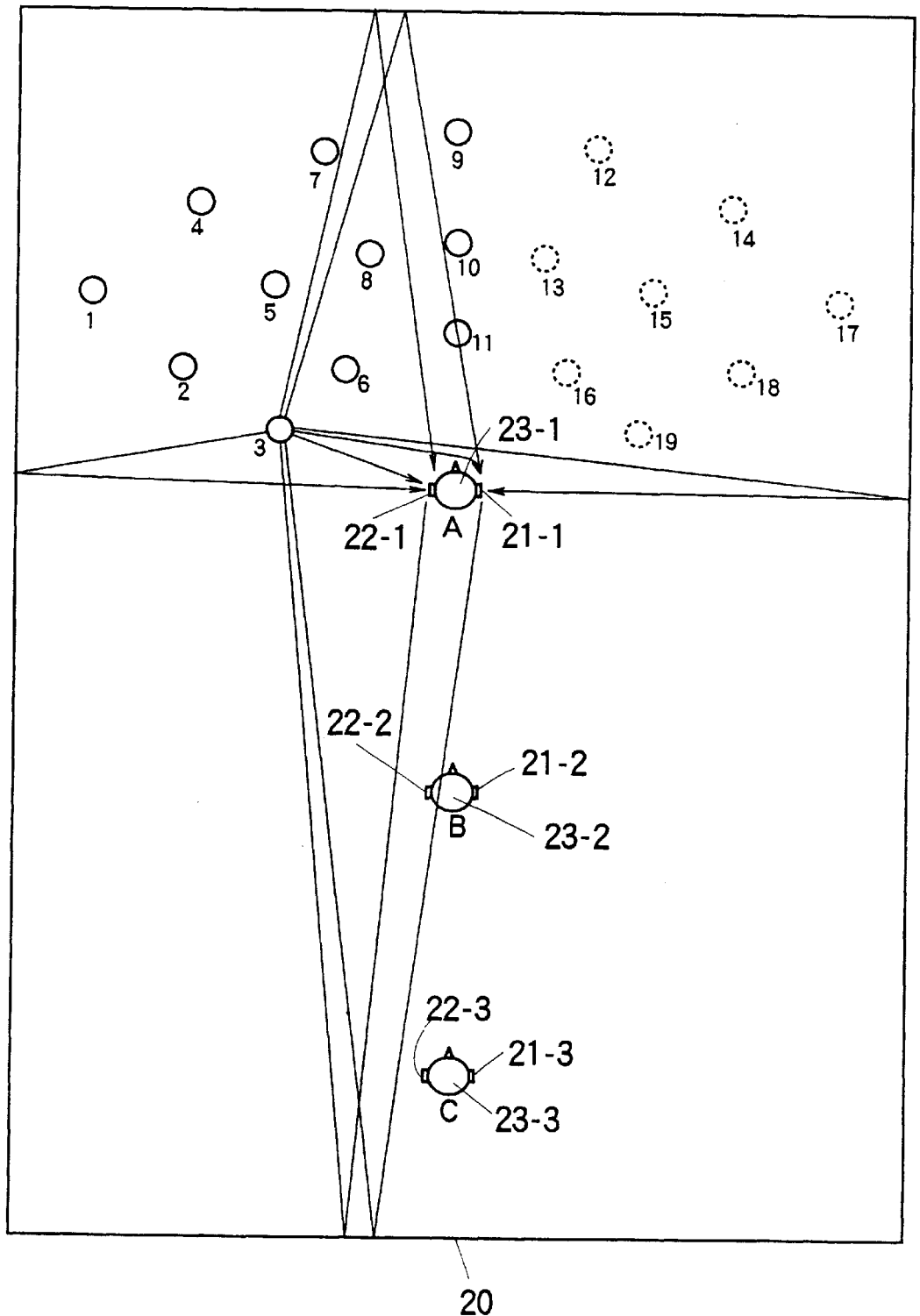
FIG. 1 is a schematic diagram illustrating a measurement of transfer functions according to the invention.

Referring to FIG. 1, provisional description is given to measurement of transfer functions in a given sound field according to the invention. A plurality of source points numbered "1"–"19" are set within a finite sound field such as a room 20. An impulse sound source is successively positioned to each of the source points for measurement of respective transfer functions. Based on the measurement results, a multiple of tone color species having various timbres will be selectively localized to these source points so as to reproduce an orchestra sound or else as if various instrument members of the orchestra were positioned to the specified source points. In the illustrated situation, the impulse sound source is set at the source point "3", and an impulse sound emitted therefrom is received at a listening point A that is a conductor's position to measure the transfer function. Namely, a part of the impulse sound from the source point "3" directly reaches a dummy head 23-1 positioned at the listening point A and the remaining parts of the same impulse sound are reflected by walls of the room 20 to indirectly reach the dummy head 23-1. The dummy head 23-1 has a pair of microphones 21-1, 22-1 attached to right and left ears of the dummy head 23-1 for receiving the impulse sounds, which are analyzed to measure the transfer functions for right and left channels.

In addition to the first dummy head 23-1 positioned at the conductor's point A, a second dummy head 23-2 is positioned to another listening point B, which is an optimum position for listening to a musical sound in the room 20. Further, a third dummy head 23-3 is positioned to a rear listening point C. In manner similar to the first dummy head 23-1, the second dummy head 23-2 has a pair of right and left microphones 21-2, 22-2, and the third dummy head 23-3 has another pair of right and left microphones 21-3, 22-3. These microphones likewise receive the impulse sound emitted from the source point "3" to measure the transfer functions relative to the listening points B and C, respectively.

By such a manner, the impulse sound source is successively positioned to the respective source points "1"–"11" to measure the transfer functions with respect to the listening points A, B, C. Further, transfer functions of the remaining source points "12"–"19" are derived from the measured transfer functions based on the symmetry of the righthand source points "12"–"19" to the lefthand source points "1"–"8" with respect to the center line of the room 20. Namely, each transfer function of the right source points "12"–"19" are derived from each measured transfer function of the symmetrically corresponding left source points "1"–"8" while exchanging a pair of the measured transfer functions between the right ear and left ear. Consequently, a number of the source points to which the impulse sound source is actually set for the measurement is reduced by half to thereby facilitate the determination of all the transfer functions. Further, the measurement of the transfer functions shown in FIG. 1 can eliminate a shift of the transfer function due to positioned error to thereby improve a fidelity of the measured transfer function. Moreover, the exchange of the right and left channel transfer functions may cause only a negligible error due to a slight difference of the head between the left side and the right side. In addition, the pair of right and left transfer functions assigned to each of the center source points "9", "10" and "11" may have a slight differences between the right channel and the left channel to thereby avoid reproduction of a monaural sound. The thus obtained transfer function represents reverberation characteristics of the room. In view of this, the measurement or sampling of the transfer function is provisionally carried out in various types of sound fields such as a great concert hall, a live house, a jazz club, a music stadium, and a small concert hall. The sampled impulse response data is stored in the apparatus to effect the localization of the acoustic image having a presence in a designated one of the rooms.

Referring to FIG. 2, the sampled impulse response data is identified in terms of the field type such as a hall, a church, ... a room, the listening points such as the conductor point A, the optimum point B and the rear point C, the source points "1"–"11" at which the impulse sound source is set for the measurement, and the channels L and R. For example, an impulse response data HL1A is sampled under the condition that the impulse sound source is set at the source point "1" within the hall H while the impulse is detected at the left ear L of the dummy head positioned at the listening point A. An impulse response data HR1A is different from HL1A in that the impulse is detected at the right ear R. HL1B is different from HL1A in that the impulse is detected at the listening point B. HR1B is different from HL1B in that the impulse is detected by the right ear R. Further, HL1C is different from HL1A in that the impulse is detected at the listening point C. HR1C is different from HL1C in that the impulse is detected by the right ear R. As another example, CL11A is sampled under the condition that the impulse sound source is set at the source point "11" within the church C while the impulse is detected at the left ear L of the dummy head positioned at the listening point A. CR11A is different from CL11A in that the impulse is detected at the right ear R. CL11B is different from CL11A in that the impulse is detected at the listening point B. CR11B is different from CL11B in that the impulse is detected by the right ear R. CL11C is different from CL11A in that the impulse is detected at the listening point C. CR11A is different from CL11A in that the impulse is detected by the right ear R. Those of the impulse response data are selectively applied to an acoustic image localization circuit which is typically composed of a finite impulse response (FIR) filter. The impulse response data is used as a parameter effective to control the FIR filter.

Referring to FIG. 3, the conversion table is used for deriving the impulse response data of the rightward source points "12"–"19" from the actually sampled impulse response data of the leftward source points "1"–"8". Therefore, the impulse response data of the source points "12"–"19" are not listed in the original data table of FIG. 2. For example in the derivation, since the right source point "12" is symmetrically corresponds to the left source point "7", the impulse response data of the point "12" is derived simply from the impulse response data of the symmetric point "7" while exchanging the left and right channels with each other. Namely, HR12A is given as HL7A, and HL12A is given as HR7A. By such a manner, the data of the respective source points "12"–"19" is derived according to the conversion table of FIG. 3. Desired ones of the impulse response data are selected in terms of the source point, the room type or else, and are applied to the acoustic image localization circuit to present a desired localization of acoustic images.

Figure 4:
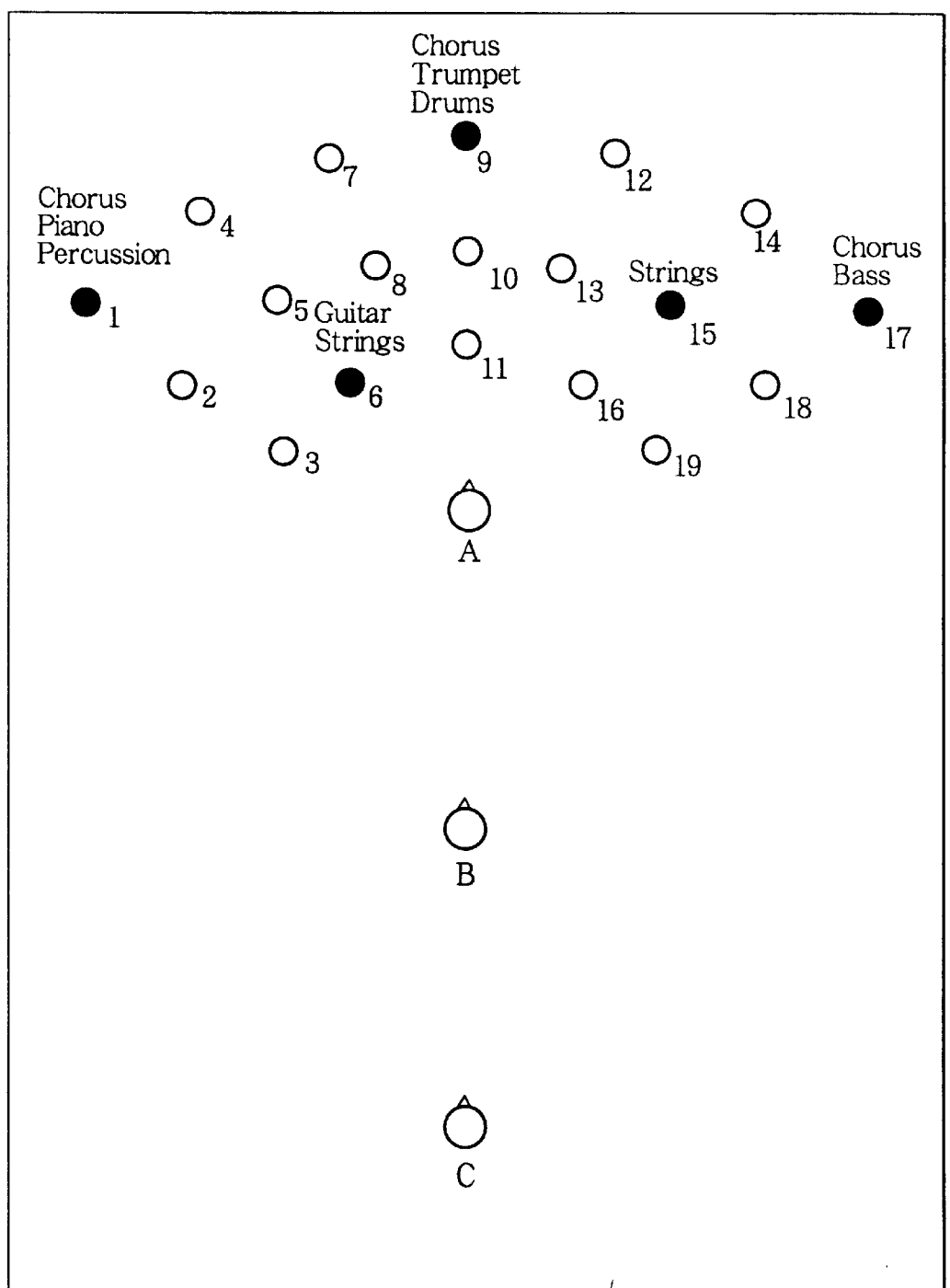
FIG. 4 is a schematic diagram illustrating an example of an assignment of tone color species to source points.

Referring to FIG. 4, according to the invention, acoustic images of multiple tone color species having various timbres are localized to specified ones of the source points "1"–"19". In the illustrated instance, source points "1", "6", "9", "15" and "17" (indicated by black circles) are specified among the predetermined source points. Further, one listening point is designated among the three listening points A, B and C. In more detail, the specified source point "1" is assigned with one group of three tone color species having different timbres of chorus, piano and percussion. The specified source point "6" is assigned with a group of two tone color species having timbres of guitar and strings. The specified source point "9" is assigned with a group of three tone color species having timbres of chorus, trumpet and drums, respectively. The specified source point "15" is assigned with a group of a single tone color species having timbre of strings. The last specified source point "17" is assigned with a group of two tone color species having timbres of chorus and bass. In summary, each of the multiple tone color species is assigned to one or more of the specified source point such that each specified source point is assigned with a group of desired tone color species.

Figure 5:
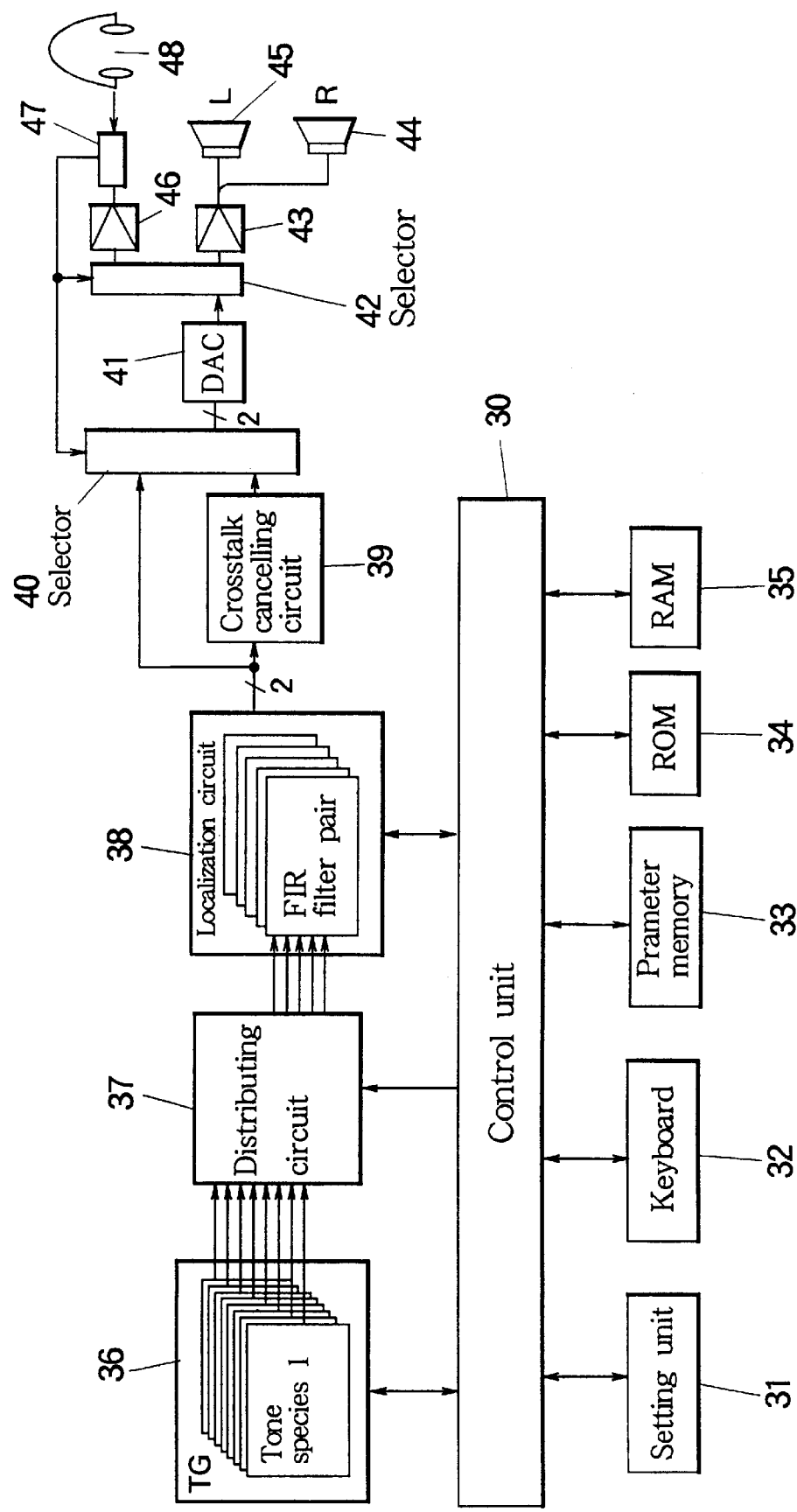
Fig. 5 is a block diagram showing an acoustic image localization apparatus of an electronic musical instrument according to the invention.

Referring to FIG. 5, the electronic musical instrument containing the inventive acoustic image localization apparatus is provided with a control unit 30 composed of a microcomputer having CPU for controlling the entire system of the instrument. A ROM 34 memorizes a control program of the control unit 30, and various control data of the tone color species. A RAN1 35 is utilized as a working register or else of the control unit 30. A keyboard 32 is divided into an upper key section, a lower key section and a pedal key section. A tone generator (TG) 36 generates a monaural signal containing eight number of tone color species "1"–"8" which have various timbres such as guitar, piano and else, which are selectively set in the tone generator 36. Thus, the electronic musical instrument can concurrently reproduce the eight number of the tone color species having the different timbres. In this embodiment, four number of the tone color species are associated to the upper key section of the, keyboard 32, two number of the tone color species are associated to the lower key section, and last two number of the tone color species are associated to the pedal key section. Accordingly, the upper key section is manually played so as to generate four kinds of timbres. In similar manner, the lower key section is manipulated to concurrently generate two kinds of timbres, and the pedal key section is actuated to concurrently generate two kinds of timbres. A setting unit 31 is provided to set a tone volume balance of the eight tone color species, as well as to set key assignment of the respective tone color species.

A parameter memory 33 stores the impulse response data table shown in FIG. 2, which contains FIR parameters classified in terms of the room type, the listening point and the source point for use in an acoustic image localization circuit 38. The parameter memory 33 is accessed by the control unit 30 according to desired source points specified by means of the setting unit 31 for each of the tone color species "1"–"8" and according to a desired listening point designated by means of the setting unit 31, to thereby read out particular FIR parameters which are applied to the acoustic image localization circuit 38. This localization circuit 38 is composed of five number of separate FIR filter pairs, which correspond to the respective ones of the specified source points marked by the black circles in FIG. 4. The acoustic image localization circuit 38 receives the monaural signal containing the eight number of the tone color species which are more than the five number of the FIR filter pairs. Thus, a distributing circuit 37 is interposed between the tone generator 36 and the localization circuit 38 such as to arrange and distribute the eight number of the tone color species "1"–"8" to the five number of the FIR filter pairs. Each FIR filter carries out the acoustic image localization according to the parameters supplied from the memory 33 so that the acoustic image localization circuit 38 outputs a pair of right and left channel signals.

A headphone 48 is provided connectably to a jack 47. When the headphone 48 is attached to the jack 47, the jack 47 controls a first selector 40 to directly connect the output of the localization circuit 38 to a digital to analog converter (DAC) 41. Further, a second selector 42 is controlled to connect the output of the DAC 41 to an amplifier 46. Consequently, the digital output of the localization circuit 38 is converted into an analog signal by the DAC 41, which is then amplified by the amplifier 46 to drive the headphone 48. By this, the headphone 48 reproduces a stereo sound containing acoustic images of the tone color species which are separately localized to the specified source points as shown in FIG. 4. The localized acoustic image is auditioned as if received at the designated listening point. On the other hand, if the headphone 48 is detached from the jack 47, the first selector 40 operates to connect the output of the localization circuit 38 to the DAC 41 through a crosstalk cancelling circuit 39. Further, the second selector 42 is operated to connect the output of the DAC 41 to another amplifier 43. This amplifier 43 amplifies the analog output of the DAC 41 to drive a pair of right and left loudspeakers 44, 45. The crosstalk cancelling circuit 39 cancels a signal component which crosstalks from one ear to another ear so as to sharply localize an acoustic image of the stereo sound produced from the pair of the loudspeakers 44, 45. Such a cancelling circuit is disclosed, for example, in Japanese Laid-Open Patent Application No. 4-150400. Generally, loudspeakers and a listening position must be optimumly located to obtain an accurate localization of the acoustic image. However, the electronic musical instrument normally has builtin loudspeakers, and the player's position (i.e., listener's position) is fixed relative to a machine so that the acoustic image is readily localized as set by the instrument.

Figure 6:
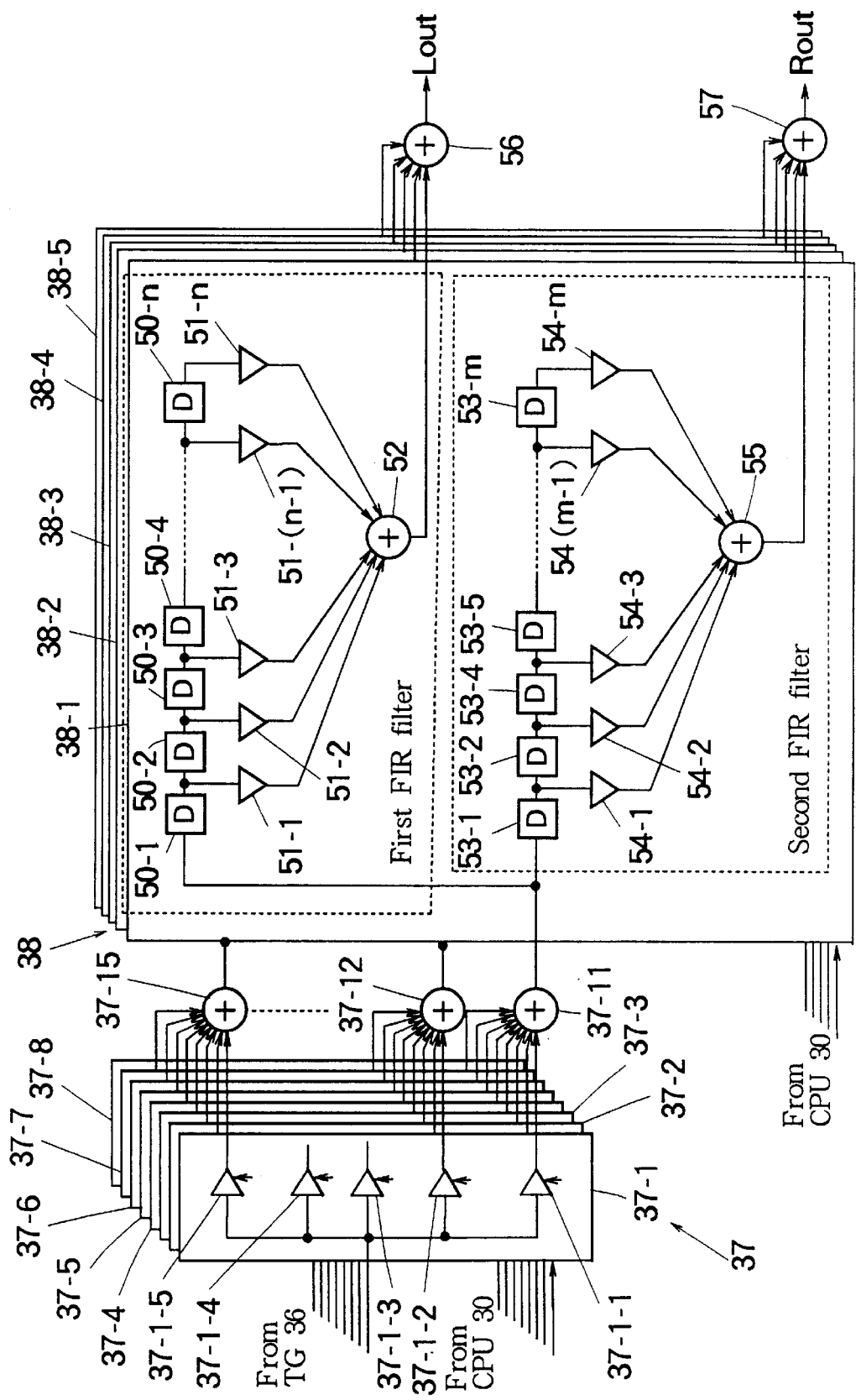
FIG. 6 is a detailed circuit diagram showing a distributing circuit and a localizing circuit included in the inventive acoustic image localization apparatus.

Referring next to FIG. 6, the distributing circuit 37 is comprised of eight number of distributing units 37-1, ..., 37-8, which correspond to the eight number of the tone color species "1"–"8". The figure shows a detailed construction of the first distributing unit 37-1. The remaining distributing units 37-2, 37-8 have the same construction as that of the first distributing unit 37-1. The distributing unit 37-1 is comprised of five number of parallel multipliers 37-1-1, ..., 37-1-5, which are set with multiplication factors fed from the control unit 30. The multiplication factor can be set freely in the range of "0" through "1". For example, when the multiplication factor "0" is set to the first multiplier 37-1-1, the input of the same is completely blocked. On the other hand, when the multiplication factor "1" is set to the first multiplier 37-1-1, the input passes through the same as it is. Further, these multiplication factors can be adjusted to effect the volume regulation of the respective tone color species in case that two or more of the tone color species are associated to the same key section such as the four tone color species are associated to the upper key section. The respective outputs of these five multipliers 37-1-1, ..., 37-1-5 are fed to corresponding ones of five terminal adders 37-11, ..., 37-15. Such a signal processing is also carried out by the remaining distributing units 37-2, ..., 37-8 according to control signals representative of a set of the multiplication factors provided from the control unit 30. The outputs from the five multipliers of each distributing unit are fed to the five corresponding terminal adders 37-11, ..., 37-15. The added results of the respective terminal adders 37-11, ..., 37-15 are fed to the subsequent localization circuit 38. In summary, the distributing circuit 37 has five number of the terminal adders 37-11, ..., 37-15, and receives the monaural signal for distributing each of the eight tone color species contained in the monaural signal to one or more of the five terminal adders 37-11, ..., 37-15, such that each terminal adder collects a group of the tone color species selectively distributed thereto.

The acoustic image localization circuit 38 is comprised of five number of localizing units 38-1, ..., 38-5, and a pair of output adders 56, 57. The first localizing unit 38-1 has a detailed circuit construction as shown in the figure. The remaining localizing units 38-2, ..., 38-5 have the same construction as that of the first localizing unit 38-1. The localizing unit 38-1 is comprised of a pair of first and second FIR filters. The first FIR filter is comprised of delay elements 50-1, ..., 50-n connected in series to each other, multipliers 51-1, ..., 51-n for multiplying the respective outputs of the delay elements 50-1, ..., 50-n by given coefficients, and an adder 52 for adding all the outputs of the multipliers 51-1, ..., 51-n with each other. In similar manner, the second FIR filter is comprised of delay elements 53-1, ..., 53-m which are serially connected to each other, multipliers 54-1, ..., 54-m for multiplying the respective outputs of the delay elements 53-1, ..., 53-m by different coefficients, and an adder 55 for summing all the outputs of the multipliers 54-1, ..., 54-m. These first and second FIR filters can perform desired filtering characteristics according to the coefficients set to the respective multipliers. The multipliers 51-1, ..., 51-n and 54-1, ..., 54-m receive the respective coefficients contained in the FIR parameters which are read out from the parameter memory 33 according to the selected room type, the designated listening point and the specified source points by means of the control unit 30, thereby performing desired filtering processes. The summed output from the adder 52 of the first FIR filter is fed to the output adder 56, while the other summed output from the adder 55 of the second FIR filter is fed to the output adder 57. The output adder 56 also receives the outputs from the first FIR filters of the remaining localizing units 38-2, ..., 38-5 to produce a left channel signal. In similar manner, the other output adder 57 also receives the outputs from the second FIR filters of the remaining localizing units 38-2, ..., 38-5 to produce a right channel signal. In summary, the acoustic image localization circuit 38 has the five number of the localizing units 38-1, 38-2, ..., 38-5 connected correspondingly to the respective terminal adders 37-11, 37-12, ..., 37-15 of the distributing circuit 37 such that each localizing unit processes a corresponding group of the tone color species to localize an acoustic image of the corresponding group separately from other groups in a given sound field, i.e., the selected type of the room. The pair of the output adders 56, 57 receive all the groups from the localization circuit 38 for producing a stereo signal, i.e., the pair of the left and right channel signals having the five number of the acoustic images separately localized from each other in the sound field.

Figure 7:
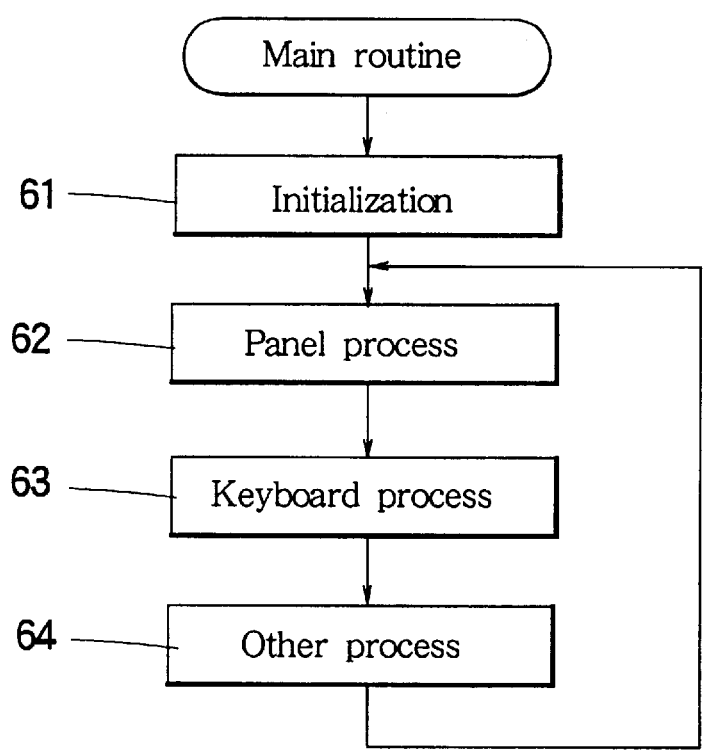
FIG. 7 is a flowchart showing operation of a control unit in the electronic musical instrument.
Figure 8:
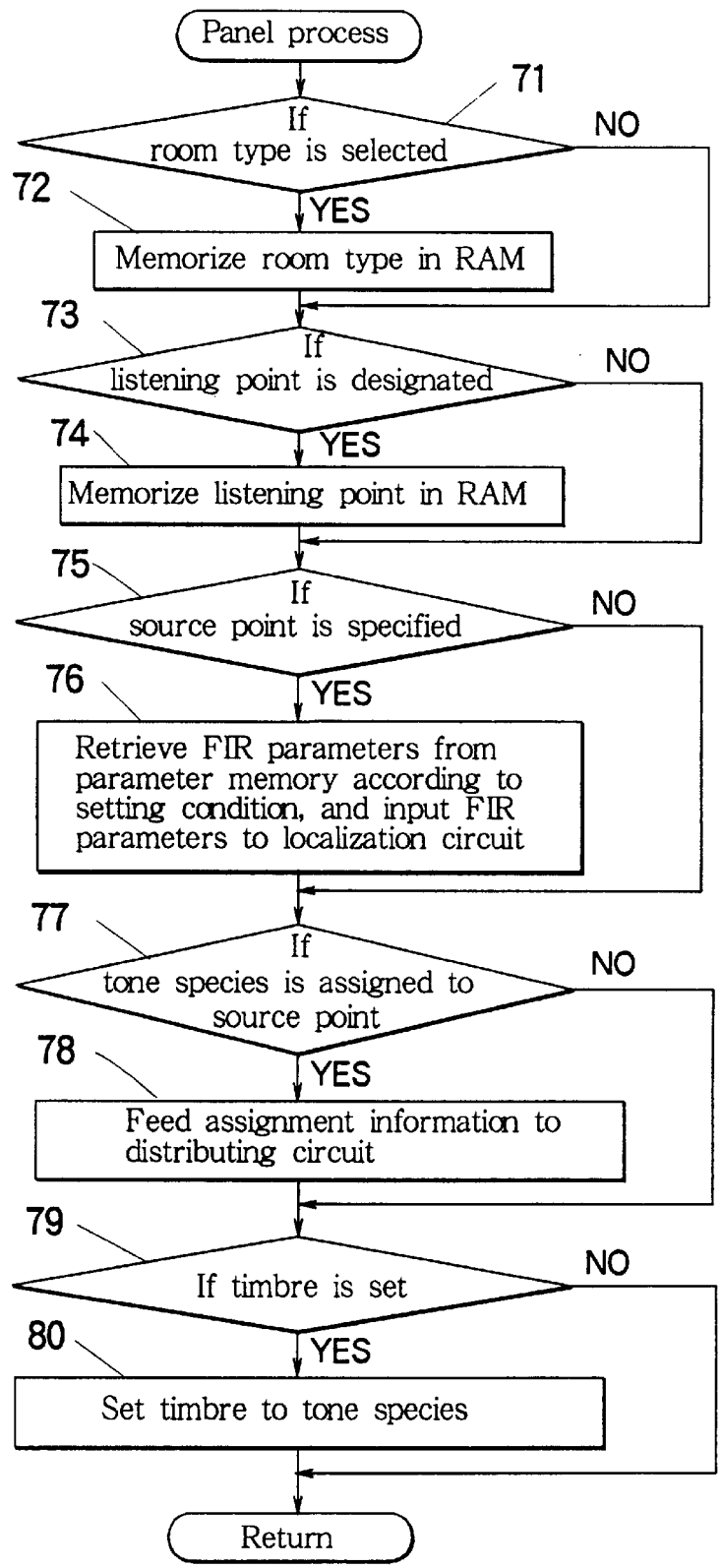
FIG. 8 is a flowchart showing a panel process in the electronic musical instrument.
Figure 9:
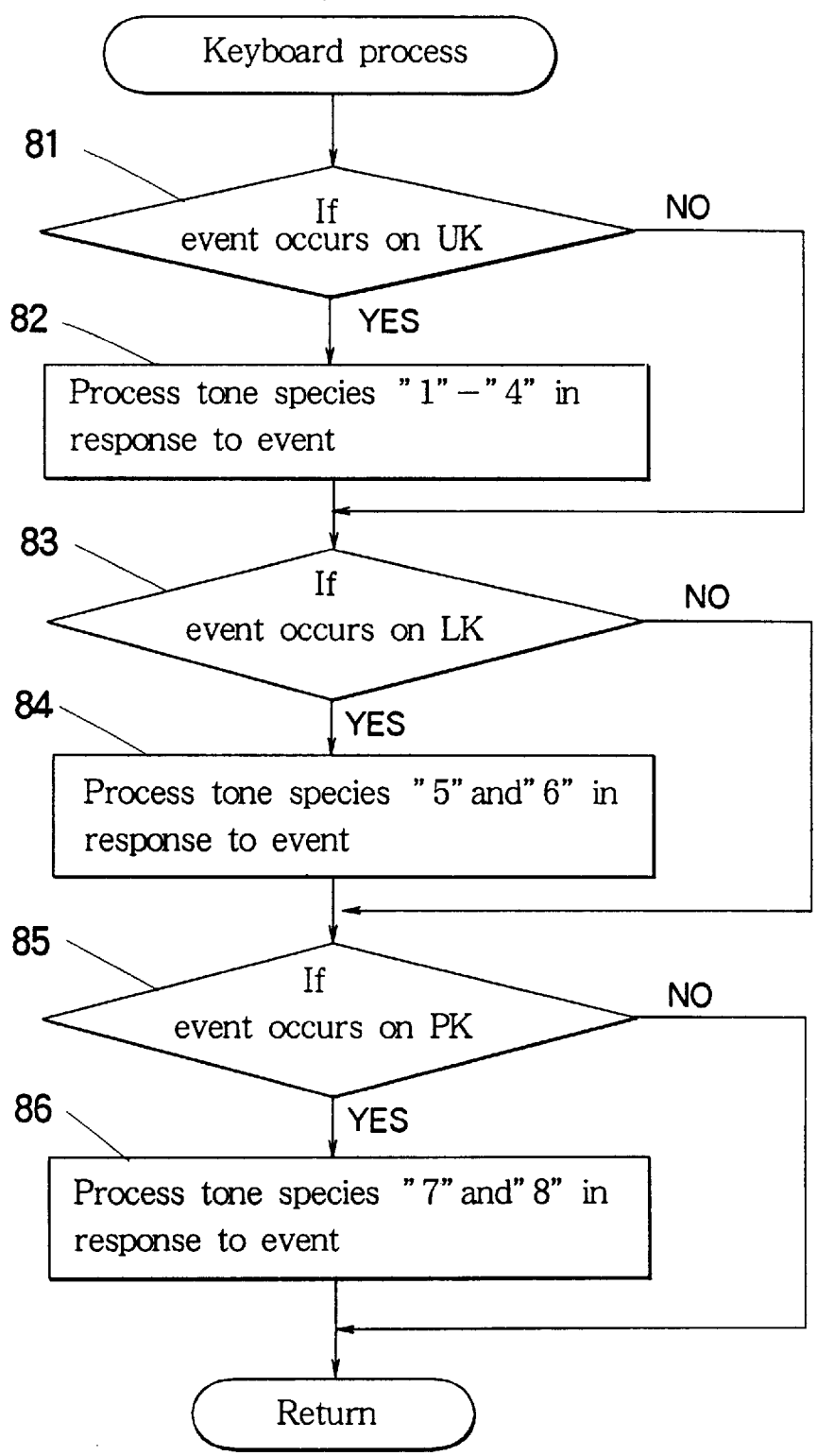
FIG. 9 is a flowchart showing a keyboard process in the electronic musical instrument.
Figure 10:
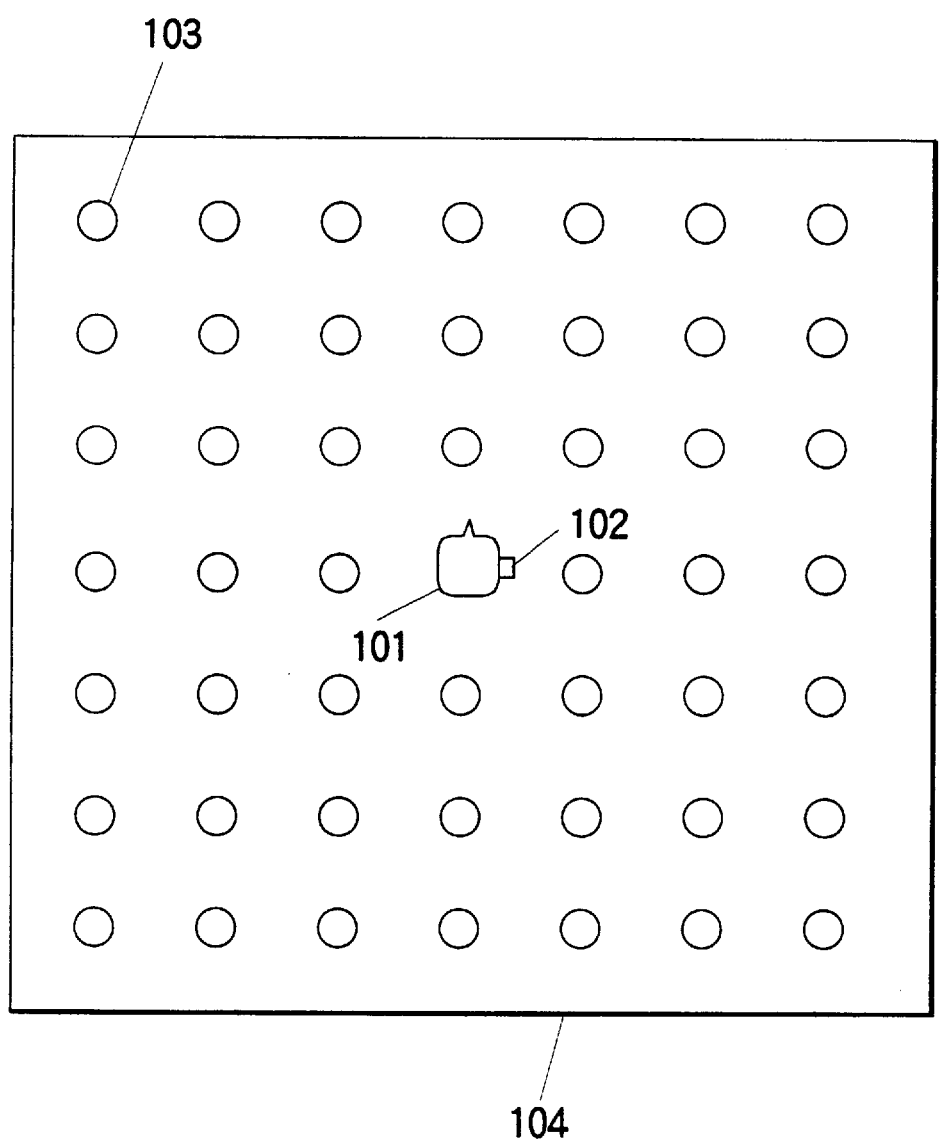
FIG. 10 is a schematic diagram showing a conventional measurement of the transfer functions in a sound field.
Figure 11:
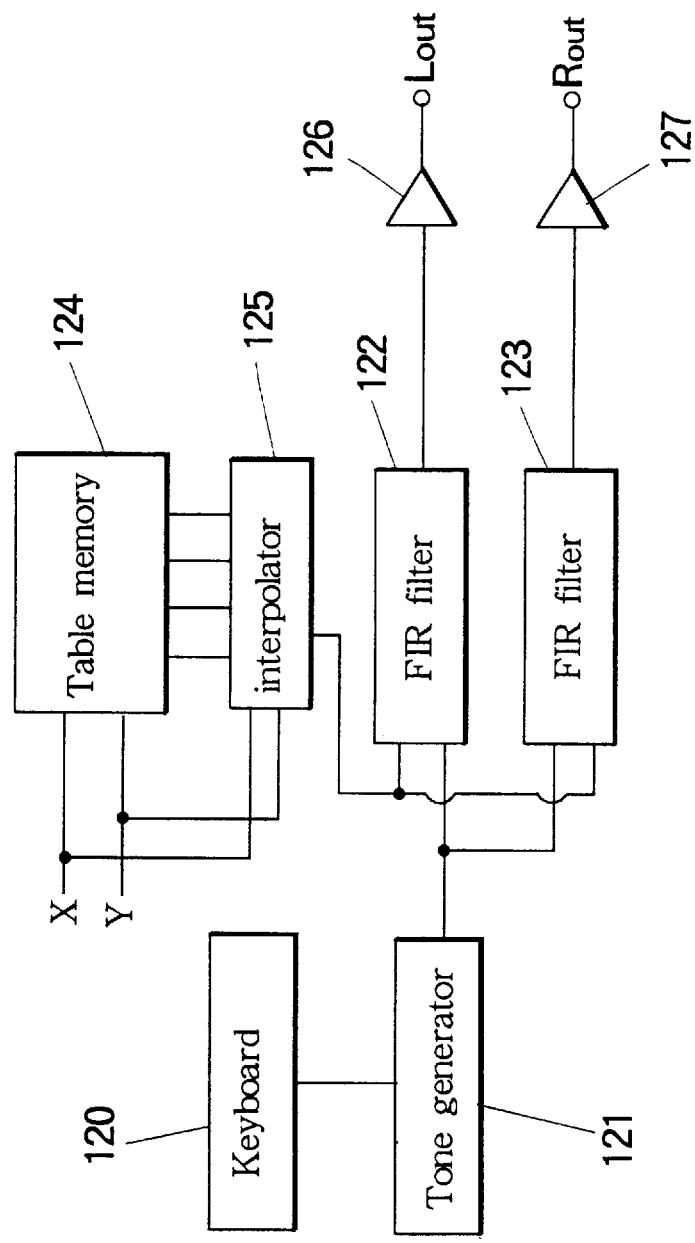
FIG. 11 is a block diagram showing a conventional acoustic image localization apparatus.

Next, the operation of the inventive acoustic image localization apparatus of the electronic musical instrument is described in conjunction with flowcharts of FIGS. 7–9. Referring first to FIG. 7, the control unit 30 composed of a CPU executes a main routine as shown in the flowchart. Upon switching-on of a power supply, Step 61 is undertaken to carry out initialization. Next, Step 62 is undertaken to carry out a panel process, such that setting conditions inputted by means of the setting unit 31 composed of an operating panel is memorized in the RAM 35. The setting conditions may include selection of a room type, designation of a listening point, assignment of source points and so on. Subsequently, Step 63 is undertaken to carry out a keyboard process such that an event on the keyboard 32 is detected to effect generating and silencing of various tone color species. Lastly, Step 64 is undertaken to carry out other process, thereby returning to the panel process of Step 62. Namely, the CPU cyclicly executes a loop composed of Steps 62-64.

Referring to FIG. 8, in a subroutine of the panel process, firstly Step 71 is undertaken to check as to if selection of the field type such as a hall, a church, a room or else is inputted. If YES, Step 72 is undertaken to memorize the selected field or room type in the RAM 35 thereby proceeding to Step 73. If the check result of Step 12 is NO, Step 73 is immediately undertaken to check as to if a desired listening point is designated from those of the conductor's point, the optimum point and the rear point. If YES, Step 74 is undertaken to memorize the designated listening point in the RAM 35, thereby proceeding to Step 75. If the check result of Step 73 is NO, Step 75 is subsequently undertaken to check as to if desired source points are specified. For example, as shown in FIG. 4, the five number of the source points "1", "6", "9", "15" and "17" are specified among the nineteen number of the source points "1"–"19".

If the check result of Step 75 is found YES, subsequent Step 76 is undertaken to retrieve the FIR parameters from the parameter memory 33 according to the setting conditions such as the selected field type, the designated listening point and the specified source points, and to input the retrieved FIR parameters into the acoustic image localization circuit 38. In case that the specified source points belong to the right side of the sound field, the FIR parameters are read out through the conversion table to exchange the right and left channel parameters with each other. Then, processing advances to Step 77. If the check result of Step 75 is found NO, Step 77 is subsequently undertaken without executing Step 76. In Step 77, check is made as to if the plurality of the tone color species are selectively assigned to the specified source points. If YES, Step 78 is undertaken to feed the assignment information to the distributing circuit 37, thereby proceeding to Step 79. If the check result of Step 77 is found NO, Step 79 is subsequently undertaken to check as to if timbre settings are inputted. If YES, Step 80 is undertaken to set the various timbres such as guitar, piano and so on to the corresponding tone color species, thereby finishing the panel process to return. If the check result of Step 79 is found NO, the subroutine immediately returns.

Referring to FIG. 9, in a subroutine of the keyboard process, firstly Step 81 is undertaken to check as to if an event occurs on the upper key section UK. If YES, Step 82 is undertaken such that tone generating channels of the tone generator 36 corresponding to the events are assigned to the tone color species "1"–"4" associated to the upper key section to thereby effect sounding of the tone color species "1"–"4", thereby proceeding to Step 83. If the check result of Step 81 is found NO, Step 83 is subsequently undertaken to check as to if an event occurs on the lower key section LK. If YES, subsequent Step 84 is undertaken such that tone generating channels corresponding to the events are assigned to the tone color species "5" and "6" associated to the lower key section so as to sound the tone color species "5" and "6", thereby proceeding to Step 85. If the check result of Step 83 is found NO, Step 85 is subsequently undertaken to check as to if events occur on the pedal key section PK. If YES, Step 86 is undertaken such that tone generating channels corresponding to the events are assigned to the tone color species "7" and "8" associated to the pedal key section so as to sound the tone color species "7" and "8", thereby finishing the keyboard process to return. If the check result of Step 85 is found NO, the subroutine immediately returns.

As described in the panel process, the eight number of the tone color species are separately assigned to the five number of the source points specified from the source points "1"–"19", for example, as shown in FIG. 4. The assigned source point of each tone color species is unchanged, while a timbre of each tone color species can be freely set. In the FIG. 4 example, the tone color species "1" has a particular timbre of chorus, and is concurrently assigned to the source points "1", "9" and "17". Consequently, the chorus sound can be heard as if emitted from the three different source points to thereby realize the chorus sound having a wide presence. Further, the tone color species "2" having a timbre of strings is localized to the source point "6" and the tone color species "3" likewise having a timbre of strings is localized to the source point "15" so that the strings sound is heard as if emitted from the two number of the source points "6" and "15" to thereby present two sets of strings separately arranged in the sound field. Moreover, the tone color species "2" may be set with a particular timbre of guitar. In the disclosed embodiment, the number of the localizing units is less than that of the tone color species. However, one tone color species can be distributed to two or more of the localizing units to impart different localizations of the acoustic image to the same tone color species to thereby enhance varieties of the acoustic image localization in spite of the smaller number of the localizing units of the FIR filters. In modification, different field types can be mixed with each other such that some of the source points may belong to a hall and other source points may belong to a church to synthesize a new acoustic effect. In practice, if the same tone color species is distributed concurrently to a multiple of separate source points, the multiplication factor of the tone color species may be set to a small value in the distributing circuit so as to balance a tone volume of this tone color species relative to the remaining tone color species.

As described above, according to the present invention, a plurality of tone color species can be separately and freely localized to a multiple of source points to thereby realize a presence as if various instruments are played in a wide space like an orchestra. Further, several listening points can be designated so as to evaluate how the stereo sound is heard by audience.

What is claimed is:

1. An acoustic image localization apparatus comprising:
   a generator that generates a sound signal;

a memory device that stores a plurality of impulse response data;

a first designator circuit that designates one of separate listening points that are predetermined separately from each other in a sound field;

a second designator circuit that designates one of separate source points that are predetermined separately from each other in a sound field; and a sound localizer that localizes an acoustic image of the sound signal to a sound point by filtering the sound signal based on impulse response data read out from the memory in accordance with the listening point designated by the first designator circuit and the source point designated by the second designator circuit, wherein the acoustic image of the sound signal is localized to the designated source point as if the acoustic image is directed to the designated listening point.

2. An acoustic image localization apparatus according to claim 8, further comprising a selector circuit that selects one of predetermined sound fields, wherein the impulse response data is read out from the memory in accordance with the designated listening point, designated source point and the predetermined sound field selected by the selector, and the acoustic image is localized to the designated source point as if the acoustic image is presented in the selected predetermined sound field and as if the acoustic image is directed to the designated listening point.

3. An acoustic image localization apparatus comprising:

providing means for providing a sound signal;

memory means for storing a plurality of impulse response data;

first designating means for designating one of separate listening points that are predetermined separately from each other in a sound field;

second designating means for designating one of separate source points that are predetermined separately from each other in a sound field; and sound localizing means for localizing an acoustic image of the sound signal to a sound point by filtering the sound signal based on impulse response data read out from the memory means in accordance with the listening point designated by the first designating means and the source point designated by the second designating means, wherein the acoustic image of the sound signal is localized to the designated source point in a sound field as if the acoustic image is directed to the designated listening point.

4. An acoustic image localization apparatus according to claim 3, further comprising third designating means for designating one of predetermined sound fields that are different from each other, wherein the impulse response data is read out from the memory means in accordance with the designated listening point, designated source point and the predetermined sound field designated by the third designating means, and the acoustic image is localized to the designated source point as if the acoustic image is presented in the designated predetermined sound field and as if the acoustic image is directed to the designated listening point.

5. An acoustic image localization apparatus comprising:

providing means for providing a sound signal;

first designating means for designating one of separate listening points that are predetermined separately from each other in a sound field;

second designating means for designating one of separate source points that are predetermined separately from each other in a sound field;

third designating means for designating one of predetermined sound fields that are different from each other;

memory means for storing a set of impulse response data for every listening point, every source point and every sound field; and sound localizing means for localizing an acoustic image of the sound signal to a sound point by filtering the sound signal in accordance with the set of impulse response data read out from the memory means that corresponds to the designated listening point, designated source point and designated sound field, wherein the acoustic image of the sound signal is localized to the designated source point in the designated sound field as if the acoustic image is directed to the designated listening point.

6. An acoustic image localization apparatus comprising:

a generator that generates a sound signal;

a first designator circuit that designates one of separate listening points that are predetermined separately from each other in a sound field;

a second designator circuit that designates one of separate source points that are predetermined separately from each other in a sound field;

a selector that selects one of predetermined sound fields that are different from each other;

a memory device that stores a set of impulse response data for every listening point, every source point and every sound field; and a sound localizer that localizes an acoustic image of the sound signal to a sound point by filtering the sound signal in accordance with the set of impulse response data read out from the memory device that corresponds to the designated listening point, designated source point and designated sound field, wherein the acoustic image of the sound signal is localized to the designated source point in the designated sound field as if the acoustic image is directed to the designated listening point.

7. A method of acoustic image localization, the method comprising the steps of:

providing a sound signal;

storing a plurality of impulse response data;

designating one of separate listening points that are predetermined separately from each other in a sound field;

designating one of separate source points that are predetermined separately from each other in a sound field;

reading out the impulse response data in accordance with the designated listening point and the designated source point; and localizing an acoustic image of the sound signal to a sound point by filtering the sound signal based on the read out impulse response data, wherein the acoustic image of the sound signal is localized to the designated source point in a sound field as if the acoustic image is directed to the designated listening point.

8. A method according to claim 3, further comprising designating one of predetermined sound fields that are different from each other, wherein the impulse response data is read out from the memory means in accordance with the designated listening point, designated source point and the predetermined sound field designated by the third designating means, and the acoustic image is localized to the designated source point as if the acoustic image is presented in the designated predetermined sound field and as if the acoustic image is directed to the designated listening point.

9. A method of acoustic image localization, the method comprising the steps of:

providing a sound signal;

designating one of separate listening points that are predetermined separately from each other in a sound field;

designating one of separate source points that are predetermined separately from each other in a sound field;

designating one of predetermined sound fields that are different from each other;

storing a set of impulse response data for every listening point, every source point and every sound field;

reading out the impulse response data that corresponds to the designated listening point, designated source point and designated sound field; and sound localizing means for localizing an acoustic image of the sound signal to a sound point by filtering the sound signal in accordance with the set of the read out impulse response data, wherein the acoustic image of the sound signal is localized to the designated source point in the designated sound field as if the acoustic image is directed to the designated listening point.

\* \* \* \* \*